(12) United States Patent
Courousse et al.

(10) Patent No.: US 11,704,128 B2
(45) Date of Patent: Jul. 18, 2023

(54) METHOD FOR EXECUTING A MACHINE CODE FORMED FROM BLOCKS HAVING INSTRUCTIONS TO BE PROTECTED, EACH INSTRUCTION ASSOCIATED WITH A CONSTRUCTION INSTRUCTION TO MODIFY A SIGNATURE OF THE BLOCK

(71) Applicants: COMMISSARIAT A L'ENERGIE ATOMIQUE ET AUX ENERGIES ALTERNATIVES, Paris (FR); SORBONNE UNIVERSITE, Paris (FR); CENTRE NATIONAL DE LA RECHERCHE SCIENTIFIQUE, Paris (FR)

(72) Inventors: Damien Courousse, Grenoble (FR); Karine Heydemann, Paris (FR); Thierno Barry, Grenoble (FR)

(73) Assignees: COMMISSARIAT A L'ENERGIE ATOMIQUE ET AUX ENERGIES ALTERNATIVES, Paris (FR); SORBONNE UNIVERSITE, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 215 days.

(21) Appl. No.: 16/603,786

(22) PCT Filed: Mar. 20, 2018

(86) PCT No.: PCT/FR2018/050678
§ 371 (c)(1),
(2) Date: Oct. 8, 2019

(87) PCT Pub. No.: WO2018/189443
PCT Pub. Date: Oct. 18, 2018

(65) Prior Publication Data
US 2020/0257805 A1    Aug. 13, 2020

(30) Foreign Application Priority Data

Apr. 11, 2017 (FR) ........................................ 1753175

(51) Int. Cl.
*G06F 9/30* (2018.01)

(52) U.S. Cl.
CPC ................................. *G06F 9/3005* (2013.01)

(58) Field of Classification Search
CPC ........ G06F 21/52; G06F 21/54; G06F 9/3861; G06F 9/30021; G06F 9/3005;
(Continued)

(56) References Cited

U.S. PATENT DOCUMENTS 5,974,529 A * 10/1999 Zumkehr ............... G06F 9/3005
  712/239
8,782,435 B1 * 7/2014 Ghose ................... G06F 9/3834
  713/190
(Continued)

OTHER PUBLICATIONS

Barry, Thierno, Damien Couroussé, and Bruno Robisson. "Compilation of a countermeasure against instruction-skip fault attacks." Proceedings of the Third Workshop on Cryptography and Security in Computing Systems. 2016. 6 pages (Year: 2016).*
(Continued)

*Primary Examiner* — Keith E Vicary
(74) *Attorney, Agent, or Firm* — Oblon, McClelland, Maier & Neustadt, L.L.P.

(57) ABSTRACT

An execution method includes supplying of a machine code, the machine code being formed by a succession of base blocks and each base block being associated with a signature and comprising instructions to be protected. Each instruction to be protected is immediately preceded or followed by an instruction for constructing the value of the signature associated with the base block. Each construction instruction is coded on strictly less than N bits, and each word of the
(Continued)

machine code which comprises at least one portion of one of said instructions to be protected also comprises one of the construction instructions so that A is not possible to load an instruction to be protected into an execution file, without at the same time loading a construction instruction which modifies the value of the signature associated with the base block when it is executed.

14 Claims, 4 Drawing Sheets

(58) Field of Classification Search
CPC ............... G06F 9/3853; G06F 9/3816; G06F 9/00–3897; G06F 15/00–825; G06F 21/00–88; G06F 2221/00–2153
See application file for complete search history.

(56) References Cited

U.S. PATENT DOCUMENTS

| | | | | |
|---|---|---|---|---|
| 8,843,761 | B2* | 9/2014 | Meyer | G06F 11/28 713/187 |
| 9,953,158 | B1* | 4/2018 | Benameur | G06F 21/53 |
| 9,965,280 | B2* | 5/2018 | Spear | G06F 9/3859 |
| 2006/0161978 | A1* | 7/2006 | Abadi | G06F 21/52 726/22 |
| 2007/0174750 | A1* | 7/2007 | Borin | G06F 11/1004 714/732 |
| 2008/0120492 | A1* | 5/2008 | Dye | G06F 9/3005 712/225 |
| 2008/0184016 | A1* | 7/2008 | Erlingsson | G06F 9/30061 712/233 |
| 2011/0078420 | A1 | 3/2011 | Trescher | |
| 2014/0082327 | A1* | 3/2014 | Ghose | G06F 11/00 712/205 |

OTHER PUBLICATIONS

Yao, Yuan, and Patrick Schaumont. "A Low-cost Function Call Protection Mechanism Against Instruction Skip Fault Attacks." Proceedings of the 2018 Workshop on Attacks and Solutions in Hardware Security. 2018. pp. 55-64 (Year: 2018).*

Goubet, Lucien, et al. "Efficient design and evaluation of countermeasures against fault attacks using formal verification." International Conference on Smart Card Research and Advanced Applications. Springer, Cham, 2015. pp. 1-16 (Year: 2015).*

Park, Yong-joon, "Efficient Validation of Control Flow Integrity for Enhancing Computer System Security" (2010). Graduate Theses and Dissertations. 11388. 127 total pages. (Year: 2010).*

International Search Report dated May 11, 2018 in PCT/FR2018/050678 filed Mar. 20, 2018.

Erlingsson, U. et al., "XFI: Software Guards for System Address Spaces," 7th USENIX Symposium on Operation Systems Design and Implementation, 2006, pp. 75-88.

Lu, D. J. "Watchdog Processors and Structural Integrity Checking," IEEE Transaction on Computers, vol. C-31, No. 7, Jul. 1982, pp. 681-685.

Reis, G. A. et al., "SWIFT: Software Implemented Fault Tolerance," https://www.researchgate.net/publication/4129281_SWIFT_software_implemented_fault_tolerance, IEEE Xplore, doi: 10.1109/CGO.2005.34, Apr. 2005, pp. 243-254.

Szekeres, L. et al., "SoK: Eternal War in Memory," 2013 IEEE Symposium on Security and Privacy, DOI 10.11.1109/SP.2013.13, 2013, pp. 48-62.

Lalande, J-F. et al., "Software countermeasures for control flow integrity of smart card C codes," ESORICS—19th European Symposium on Research in Computer Security, Sep. 2014, pp. 200-218 (20 total pages).

Jang, D. et al., "SAFEDISPATCH: Securing C++ Virtual Calls for Memory Corruption Attacks," https://www.researchgate.net/publication/269196977_SAFEDISPATCH_Securing_C_Virtual_Calls_from_Memory_Corruption_Attacks, DOI: 10.14722/ndss.2014.23287, Jan. 2014, pp. 1-15.

Zhang, C. et., "Practical Control Flow Integrity & Randomization for Binary Executables," 2013 IEEE Sumposium on Security and Privacy, 2013, pp. 559-573.

Moro, N. et al., "Formal verification of a software countermeasure against instruction skip attacks," http://dx.doi.org/10.1007/s13389-014-0877-7, Feb. 26, 2014, pp. 1-17.

Davi, L. et al., "MoCFI: A Framework to Mitigate Control-Flow Attacks on Smartphones," https://www.researchgate.net/publication/228517736_MoCFI_A_Framework_to_Mitigate_Control-Flow_Attacks_on_Smartphones, Jan. 2012, 17 pages.

Barenghi, A. et al., "Countermeasures against Fault Attacks in Software Implemented AES: Effectiveness and Cost," WESS' vol. 10, Oct. 24, 2810, 10 pages.

Oh, N. et al., "Control-Flow Checking by Software Signatures," IEEE Transaction on Reliability, vol. 51, No. 2, Mar. 2002, pp. 111-122.

Martinez-Alvarez, A. et al.. "Compiler-Directed Soft Error Mitigation for Embedded Systems," IEEE Transactions on Dependable and Secure Computing, vol. 9, No. 2, Mar./Apr. 2012, pp. 159-172 (15 total pages).

Werner, M. at al., "protecting the Control Flow of Embedded Processors against Fault Attacks," CARDIS 2015, Lecture Notes in Computer Science, vol. 9514, 2016, pp. 161-176, XP047345561.

Tice, C. et al., "Enforcing Forward-Edge Control-Flow Integrity in GCC & LLVM," Proceedings of the 23rd USENIX Security Symposium, https://www.usenix.org/conference/usenixsecutiry14/technical-sessions/presentation/tice. Aug. 20-22, 2014, pp. 941-955 (16 total pages).

Ersoz, A. et al., "the Watchdog Task: Concurrent Error Detection Using Assertions," Center for Reliable Computing, CRC Technical Report, No. 85-8, (CSL TR No. 85-267), May 1885, pp. 1-61 (65 total pages).

Bar-El, H. et al. "The Sorcerer's Apprentice Guide to Fault Attacks," https://www.researchgate.net/publication/2942363_The_Sorcerer's_Apprentice_Guide_to_Fault_Attacks, Proceedings of the IEEE. 94, DOI: 10.1109/JPROC.2005 86242, Aug. 2004, pp. 1-13.

Nicolescu, B. et al., "SIED: Software Implemented Error Detection," Proceedings of the 18th IEEE International Symposium on Defect and Fault Tolerance in VLSI Systems (DFT '03), 2003, 8 pages.

Dekeulenaer, R., "Link-time Smart Card Code Hardening," International Journal of Information Security, Springer Berlin Heidelberg, vol. 15, Issue 2, https://doi.org/10.1007/s10207-015-0282-0, First Online Mar. 2015, pp. 111-130 (numbered 1-20).

Wang, Z., et al., "HyperSafe: Lightweight Approach to Provide Lifetime Hypervisor Control-Flow Integrity," Proceedings of the 2010 IEEE Symposium on Security and Privacy May 16-19, 2010, DOI: 10.1109/SP.2010.30, May 2010, 16 pages.

Abadi, M. et al., "Control-Flow Integrity Principles, Implementations, and Applications," ACM Journal Name, vol. V., No. N., Feb. 2007, pp. 1-41.

Bouffard, G., "A Generic Approach for Protecting Java Card™ Smart Card Against Software Attacks," Electronics, Universite de Limoges, 2014, https://tei.archives-ouvertes.fr/tel-01089654, 169 pages, XP055253587.

Lalande, J-F. et al., Software Countermeasures for Control Flow Integrity of Smart Card C Codes, ESORICS, Sep. 2014, PowerPoint, pp. 1-28, XP055442952 (29 total sheets).

* cited by examiner

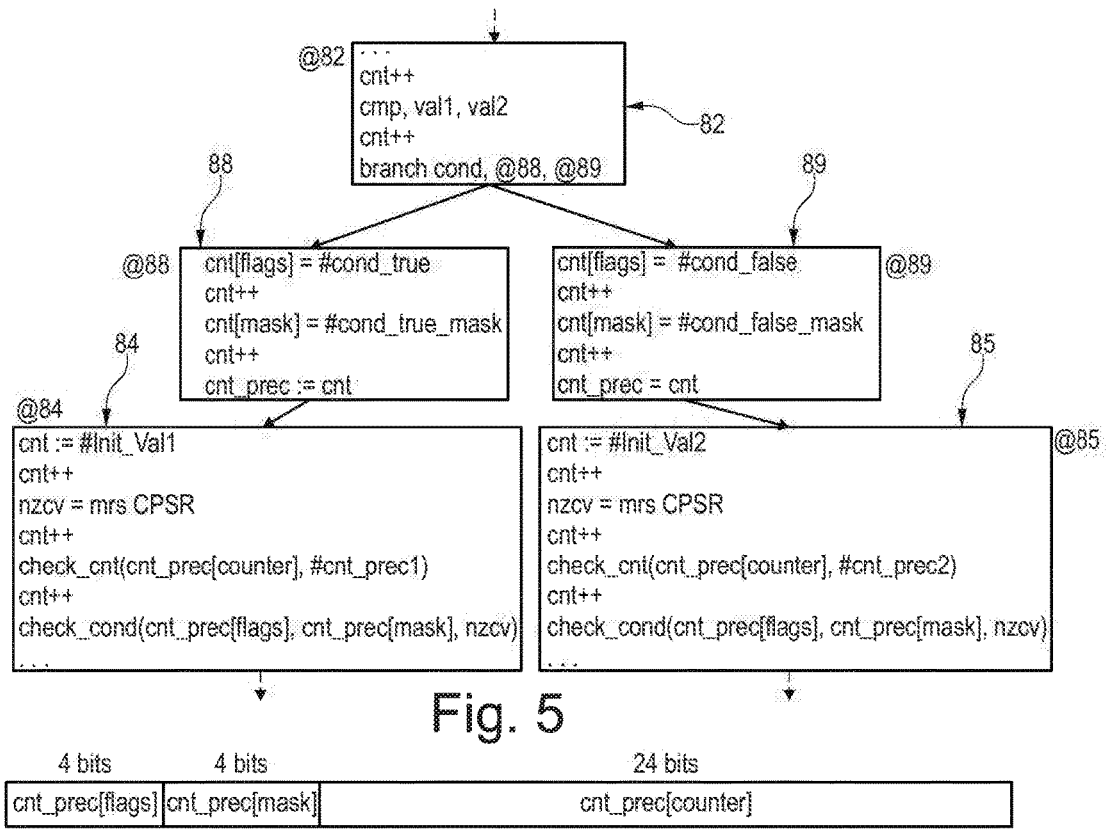
Fig. 5
Fig. 6
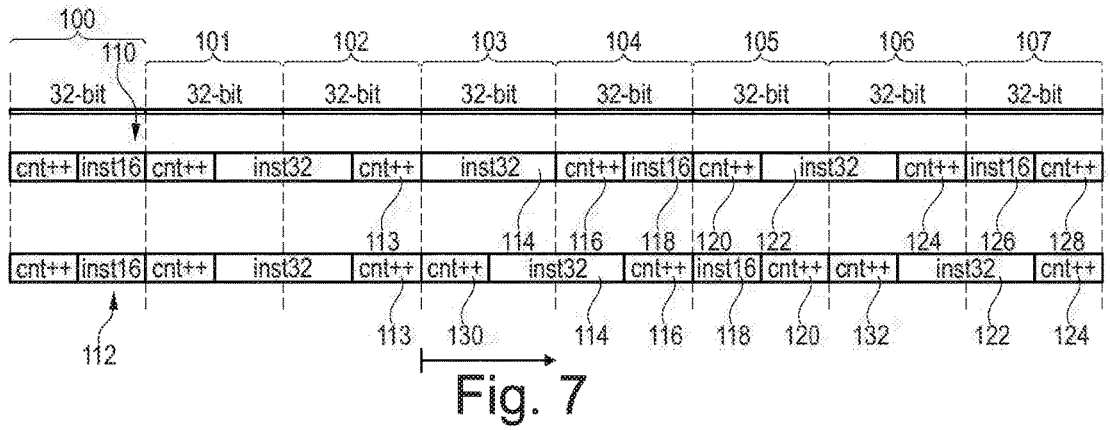
Fig. 7
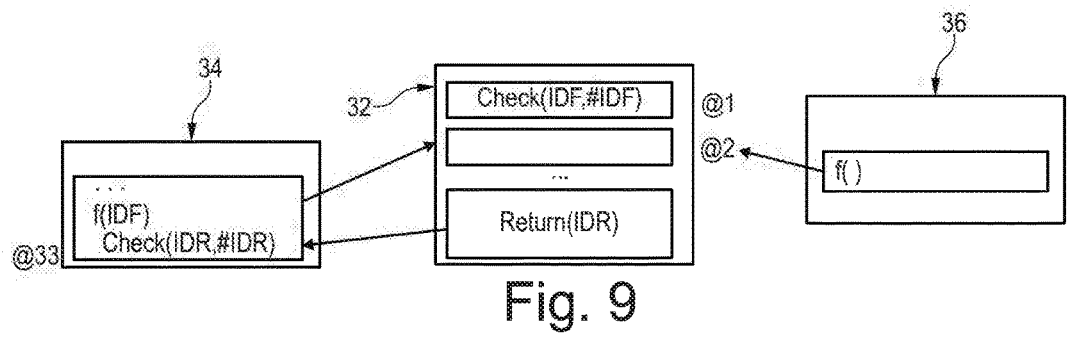
Fig. 9

METHOD FOR EXECUTING A MACHINE CODE FORMED FROM BLOCKS HAVING INSTRUCTIONS TO BE PROTECTED, EACH INSTRUCTION ASSOCIATED WITH A CONSTRUCTION INSTRUCTION TO MODIFY A SIGNATURE OF THE BLOCK

The invention relates to a method of execution of a machine code of a secure function by a microprocessor and also to a binary code including the machine code of this secure function. The invention also relates to:

an information recording medium and a device for implementing this method of execution, and a compiler for generating this binary code.

To obtain information on a binary code or to cause the binary code to function in an unexpected manner, it is known practice to, subject it to attacks known by the term "fault injection" or "fault attack". These attacks consist in disrupting the functioning of the microprocessor during the execution of the machine code by various physical means such as modifications of the supply voltages, modifications of the clock signal, exposure of the microprocessor to electromagnetic waves, and the like.

Using such disruptions, an attacker can alter the integrity of the machine instructions or of the data in order, for example, to retrieve a secret key of a cryptographic system, bypass security mechanisms such as the checking of a PIN code during an authentication or simply prevent the execution of a function essential to the security of a critical system.

A fault injection attack can cause notably three types of faults, known as execution faults, during the execution of the machine code:

1) an alteration of the instructions of the executed machine code,
2) an alteration of the values stored in variables or registers and
3) an alteration of the control flow of the machine code.

The control flow corresponds to the execution path followed during the execution of the machine code. The control flow is conventionally represented in the form of a graph known, by the term "control flow graph".

When the alteration prevents only the execution of one or more of the machine code instructions or when the alteration has an effect on the processor equivalent to the disrupted instruction not being executed, this is referred to as instruction skipping. When the alteration replaces one or more of the machine code instructions with other instructions executable by the microprocessor, this is referred to as instruction replacement.

When the alteration modifies a branch instruction, a control flow diversion effect is observed. The control flow diversion effect can be observed when a branch instruction is altered or when the condition involved in a conditional branch is modified or when the return address of a function is modified or else when the program counter of the microprocessor is modified.

The machine code of a function may be designed to enable the detection and reporting of faults caused by the fault injection. If necessary, it is also designed to automatically trigger the execution of countermeasures in response to the reporting, of a fault. When the machine code of a function is designed in this way, this machine code is referred to as "machine code of a secure function". Indeed, unlike the machine code of a non-secure function, this machine code has at least the ability to report faults typically encountered in the case of a fault injection attack.

For example, known methods of execution of a machine code of a secure function by a microprocessor involves:

a) supplying the machine code recorded in a random access main memory, this machine code being formed by a succession of basic blocks in which:

each basic block starts at a branch address and ends with an instruction to branch to a branch address of another basic block, each basic block is associated with a signature and includes instructions to be protected, each instruction to be protected being immediately preceded or followed by an instruction to construct the value of the signature associated with this basic block, the execution of each construction instruction by the microprocessor modifying the value of the signature of this basic block in a predetermined manner, each subsequent basic block which, during the execution of the machine code, is executed after a preceding basic block furthermore includes a comparison instruction set which:

triggers the comparison of the constructed value of the signature associated with the preceding basic block with an expected value of this signature determined during the generation of the machine code and, only if these values do not correspond, triggers the reporting of a fault during the execution of this machine code and, otherwise, inhibits this reporting, each basic block is divided into a succession of words of N bits each, where each of these words includes at least one machine instruction and N is a constant integer, followed by b) loading into a queue, only in complete words, the one or more instructions of the machine code that are denoted by the current value of a program counter, followed by c) executing, by way of an, arithmetic and logic unit, the instructions loaded into the queue systematically in the order in which these instructions were loaded into this queue.

For example, such a method of execution is described in the following article by Mr Lalande: J.-F. Lalande et al.: "*Software countermeasures for control flow integrity of smart card C codes*", ESORICS'14, Springer 2014, pp. 200-218, Sep. 13, 2014.

In this article, construction instructions are instructions which, when executed by the microprocessor, increment the value of a counter. It is the value of this counter which constitutes the constructed value of the signature. Also in this article, the construction instructions and the comparison instruction set are placed in the source code before and after a line to be protected in this source code.

This method has several advantages. In particular, it makes it possible both to:

detect the skipping of at least two lines of the source code, and detect a modification of the integrity of the control flow.

The term "modification of the integrity of the control flow" refers to an unanticipated and undesired alteration of the control flow of the machine code.

However, as explained in paragraph 6.2 of the article by J.-F. Lalande, the method disclosed in this article does not make it possible to detect the skipping of instructions with a finer granularity than two lines of the source code. In particular, it does not make it possible to detect the skipping, of a single instruction of the machine code.

The aim of the invention is to overcome this drawback by proposing a method of execution of a machine code of a secure function which makes it possible to detect numerous execution faults and, in particular, the skipping of instructions with a much finer granularity than is possible with the method described in the article by J.-F. Lalande, while retaining the advantages of the method described in that article.

Prior art is also known from:

Werner Mario et al.: "Protecting the Control Flow of Embedded Processors against Fault Attacks", Mar. 10, 2016, Network and Parallel Computing; Springer International Publishing; CHAIM; pages 161-176;

To this end, an object of the invention is therefore a method of execution of a machine code of a secure function as claimed in claim 1.

By incorporating a construction instruction into each word containing an instruction to be protected, it becomes possible to detect the implementation of a fault injection attack, even if only one instruction, is skipped. Indeed, in the claimed method, it is impossible to cause the skipping of even a single instruction to be protected without causing the complete word containing all or part of this instruction not to be loaded into the queue. Now, this word not being, loaded inevitably causes the construction instruction associated with this instruction not to be loaded, since it is located in the same word. This therefore makes it possible to detect a greater number of execution faults and, notably, the skipping of a single instruction of the machine code.

In the article by J.-F. Lalande, the construction instruction is associated with each line to be protected in the source code. When the source code is compiled, a line to be protected in this source code may well correspond to a collection of several instructions of the machine code. Within this collection, therefore, not all instructions are associated with a construction instruction. Hence, if a fault injection attack causes one of the instructions of this collection to be skipped, this is not necessarily reflected by an incorrect constructed value for the signature. It is therefore not always possible to detect a fault injection attack by using the method described in the article by J.-F. Lalande. In contrast, in the claimed method, each instruction to be protected in the machine code of the secure function is associated with a construction instruction. For this reason, the claimed method is more effective in detecting a fault injection attack.

An object of the invention is also a binary code as claimed in claim 2. Embodiments of this binary code may include one or more features of the dependent claims.

These embodiments of the binary code may furthermore have one or more of the following advantages:

The fact that the expected value of the signature uniquely identifies the preceding basic block makes it possible to reliably detect a diversion of the control flow. Indeed, if a basic block other than the preceding basic block is executed immediately before the subsequent basic block, then the value of the signature of this other basic block does not correspond to the expected value of the signature. This remains the case, even if this other block has exactly the same number of instructions to be protected as the preceding basic block. This therefore makes it very difficult to modify the control flow of the machine code without detection.

The use in the subsequent basic block of an expected value which corresponds to a combination of anticipated values for the signatures of the various possible preceding basic blocks makes it possible to obtain an expected value which is independent of the preceding basic block actually executed before this subsequent basic block is executed. This therefore simplifies the implementation of the comparison to be made during the execution of the subsequent basic block.

When each instruction in the comparison instruction set is immediately preceded or followed by a construction instruction, it is impossible to counteract the reporting of a fault by attempting, for example, to skip the instructions in this comparison instruction, set.

Taking into account the context of execution to check the integrity of the control flow makes it possible to detect an incorrect execution of a conditional branch instruction of a preceding basic block. For example, this makes it possible to report a branch to a first subsequent basic block although the condition is false or a branch to a second subsequent basic block although the condition is true. This therefore makes it possible to detect and report a greater number of faults, when the integrity of the control flow is modified.

The use of an increment instruction as an instruction to construct the signature speeds up the execution of the secure function since increment instructions are executed very quickly by a microprocessor.

The fact that each instruction of the secure function is treated as an instruction to be protected strengthens the security of the machine code. In addition, this simplifies the generation of the machine code by a compiler because this compiler knows that it must systematically insert a construction instruction before or after each instruction of the secure function.

The use by a non-secure function of a second branch address, located after a validation instruction set, to call the secure function makes it possible to trigger the execution of this secure function while avoiding triggering unwarranted reporting of a fault. This is because, in this case, this makes it possible to avoid executing the validation instruction set. In addition, at the same time, the use of a first branch address for calls from other secure functions makes it possible to render any attempt to modify the control flow in an unintended manner by acting, on the calls of one secure function to another secure function more difficult.

Using an identifier of the return to a calling function makes it possible to report any attempt to modify the integrity of the control flow when the latter returns from the called function to the calling function.

An object of the invention is also an information recording medium containing the claimed binary code.

An object of the invention is also an electronic device for implementing the claimed method.

Finally, an object of the invention is also a compiler capable of, automatically transforming a source code of a program containing a secure function into a binary code.

The invention will be better understood on reading the description which follows, given solely by way of nonlimiting example and with reference to the drawings, in which:

FIGS. 2 to 5 are schematic illustrations, of various portions of a machine code of a secure function that can, be executed by the device of FIG. 1;

FIG. 6 is a schematic illustration of a counter used during, the execution of the machine code of the secure function;

FIG. 7 is a schematic illustration showing the arrangement of the instructions of the machine code that can be executed by the device of FIG. 1;

FIG. 9 is a schematic illustration of certain instructions of the machine code that are implemented to make the calls of the functions to one another secure;

NOTATION AND DEFINITIONS

Figure 1:
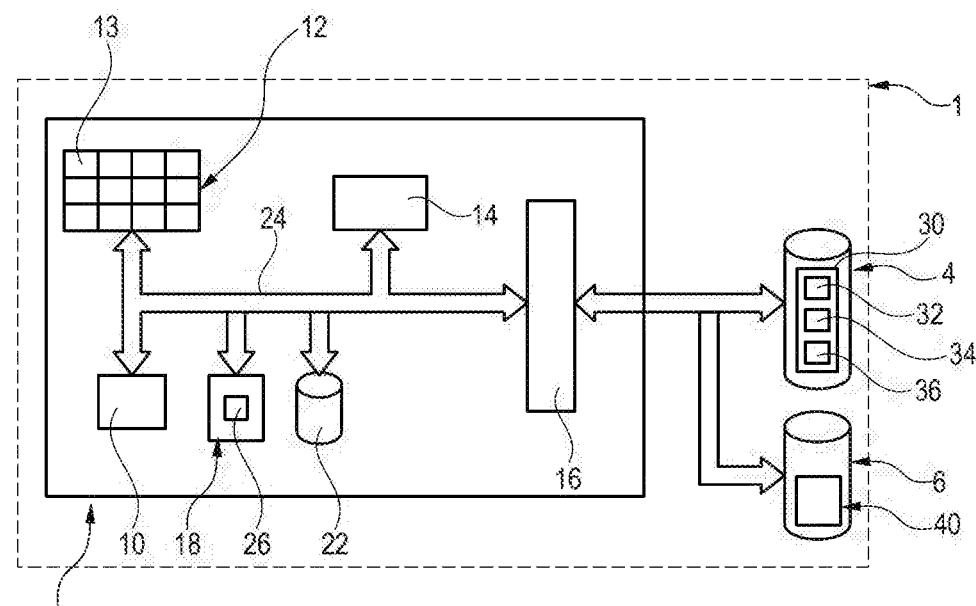
FIG. 1 is a schematic illustration of the architecture of an electronic device capable of executing a machine code of a secure function.

In these figures, the same references are used to denote the same elements. In the remainder of this description, the features and functions well known to those skilled in the art are not described in detail.

In this description, the following definitions are adopted.

A "program" denotes a set of one or more predetermined functions that it is desired for a microprocessor to execute.

A "source code" is a representation of the program in a computer language, which is not directly executable by, a microprocessor and is intended to be transformed by a compiler into a machine code directly executable by the microprocessor.

A program or code is said to be "directly executable" when it is capable of being executed by a microprocessor without this microprocessor first having to compile it by means of a compiler or interpret it by means of an interpreter.

An "instruction" denotes a machine instruction executable by microprocessor. Such an instruction consists of:
an opcode, or operation code, encoding the nature of the operation to be executed, and,
one or more operands defining the value or values of the parameters of this operation.

A "machine code" is a collection of machine instructions. It is typically a file containing a succession of bits bearing the value "0" or "1", these bits encoding the instructions to be executed by the microprocessor. The machine code is directly executable, by the microprocessor, that is to say without requiring prior interpretation or compilation.

A "binary code" is a file containing a succession of bits bearing the value "0" or "1". These bits encode data and instructions to be executed by the microprocessor. Thus, the binary code comprises at least one machine code and in addition, generally, numerical data processed by this machine code.

A "flow of instructions" is a succession of instructions arranged one after the other which forms, in the machine code, an ordered sequence of bits. The flow of instructions starts with an initial instruction and ends with a final instruction. With respect to a given instruction of the flow of instructions, the instructions located on the initial instruction side are called "preceding instructions" and the instructions located on the final instruction side are called "subsequent instructions". In this text, this flow of instructions in memory is split up into a succession of basic blocks that follow one another immediately or are separated by blocks of data.

In this text, a "basic block" is a group of successive instructions in the flow of instructions that starts at a branch address and ends with a single explicit or implicit branch instruction. An explicit branch instruction is characterized by the explicit presence of an opcode in the machine code that encodes the branch instruction. An implicit branch instruction corresponds to the case in which the execution of a preceding basic block systematically continues with the execution of a subsequent basic block located, in the machine code, immediately after the preceding basic block. In this case, since in the absence of an explicit branch instruction, the instructions of the machine code are executed in order one after the other, it is not necessary to introduce at the end of the preceding basic block an explicit instruction to branch to the subsequent basic block. In this description, the preceding basic block in this case is said to end with an implicit branch instruction because the branch instruction is not explicitly encoded in the machine code. In this case, the preceding basic block ends just before the branch address of the subsequent basic block. In the remainder of this description, all that is described in the case of explicit branch instructions also applies to implicit branch instructions. In this application, the expression "branch instruction" thus denotes either an explicit or an implicit branch instruction. Thus, the execution of a basic block systematically starts with the execution of the instruction located at its branch address and systematically ends with the execution of the branch instruction that ends this basic block. A basic block has no branch instructions other than the one located at the end of this basic block. Thus, the instructions of a basic block are systematically all read by the microprocessor one after the other in the order in which they are present in this basic block. The branch instruction, when executed, can direct the control, flow always to the same branch address or alternately to various branch addresses. The latter case arises, for example, when at the end of the executed basic block, the control flow can continue alternately to a first and to a second basic block.

A "branch instruction" is an instruction that, when executed by the microprocessor, triggers a jump to the branch address of another basic block. This branch instruction therefore includes at least the branch address of this other basic block. To this end, this instruction typically replaces the current value of the program counter with the value of the branch address will be recalled that the program counter contains the address of the next instruction to be executed by the microprocessor. In the absence of a branch instruction, each time an instruction is executed, the program counter is incremented by the size of the instruction currently executed. In the absence of a branch instruction, the instructions are systematically executed sequentially one after the other in the order in which they are recorded in a main memory. The branch instruction can be unconditional, meaning that the jump to the branch address is systematically performed as soon as this instruction is executed. An unconditional branch instruction is for example the "JMP" instruction in the assembly language for x86 series microprocessors. The branch instruction can also be conditional, meaning that the jump to the branch address is triggered when said branch instruction is executed only if a specific condition is true. For example, a conditional branch instruction is a "JE", "JA", or "JNE" instruction in assembly language. The branch instruction can equally be a call to a function. In this text, the term "branch instruction" denotes both direct and indirect branch instructions. A direct branch instruction is a branch instruction that directly, contains the numerical value of the branch address. An indirect branch instruction is an instruction to branch to a branch address contained in a memory or register of the microprocessor. Thus, unlike a direct branch instruction, an indirect branch instruction does not directly contain the numerical value of the branch address.

A "branch address" is the address in the main memory at which the first executed instruction of a basic block is located. A branch address will be referred to below even for the basic blocks the first instruction of which is executed following the execution of an implicit branch instruction.

Reference will be made to the execution of a function to denote the execution of the instructions embodying this function.

For the sake of simplicity, in this description and in the figures, these instructions are represented not in binary form, but rather in a symbolic form expressed in a higher-level advanced language.

DESCRIPTION OF AN EMBODIMENT

FIG. 1 shows an electronic device 1 including a microprocessor 2, a main memory 4 and an information recording medium 6. For example, the device 1 is a computer, a smartphone, an electronic tablet or the like.

The microprocessor 2 here includes:
an arithmetic and logic unit 10;
a set 12 of registers;
a control module 14;
a data input/output interface 16;
an instruction loader 18 including a program counter 26; and
a queue 22 of instructions to be executed.

The memory 4 is configured to store instructions of a binary code 30 of a program to be executed by the microprocessor 2. The memory 4 is a random access memory. Typically, the memory 4 is a volatile memory. The memory 4 may be a memory external to the microprocessor 2 as shown in FIG. 1. In this case, the memory 4 is embodied on a substrate that is mechanically separate from the substrate on which the various elements of the microprocessor 2, such as the arithmetic and logic unit 10, are embodied. However, alternatively, the memory 4 can also be an internal memory integrated within the microprocessor 2. In the latter case, it is embodied on the same substrate as the other elements of the microprocessor 2. Finally, in other configurations, the memory 4 consists of several memories, some of which are internal memories and others external memories.

In this embodiment example, and by way of illustration, the binary code 30 notably includes:
the machine code 32 of a first secure function,
the machine code 34 of a second secure function capable of calling the first function, and
the machine code 36 of a non-secure function capable of calling the first function.

Here, a "secure function" denotes a function which is encoded in machine language so as to allow the detection of a fault injection attack and notably of the skipping of instructions. Conversely, a "non-secure function" denotes a function that is encoded in machine language without implementing the techniques that will be described below for obtaining a secure function.

By way of illustration, the microprocessor 2 complies with the ARM ("Advanced RISC Machine") version 7 architecture and supports the Thumb1 and Thumb2 instruction sets.

The loader 18 loads into the queue 22 the next instruction to be executed by the arithmetic and logic unit 10 from the memory 4. More specifically, the loader 18 loads the instruction to which the program counter 26 points. The loader 18 systematically and on every occasion loads into the queue 22 a complete N-bit word, where N is a constant integer generally greater than or equal to 8, 16, 32 or 64. N is therefore the loading size used by the microprocessor 2. For example, here, N is equal to 32. The instructions of the instruction set of the microprocessor 2 have lengths that are variable and, typically, less than or equal to N bits. For example, some instructions are encoded on N bits and others on N/2 bits. Thus, when the loader 18 loads a word into the queue 22, it can:
case 1: load a single 32-bit instruction,
case 2: simultaneously load several instructions such as two instructions of 16 bits each, and
case 3: load one or more parts of one or more instructions such as a 32-bit instruction spread across two words of the machine code.

In case 3), when the recording of a word in the queue 22 does not allow the complete instruction to be recorded, the loader 18 must load the next word of the machine code to obtain the complete instruction. However, to facilitate the loading, of the instructions into the queue 22 and to minimize the number of occurrences of case 3), the code 30 is divided into a succession of N-bit words and, as often as possible, the start of a word corresponds to the start of an instruction and the end of that word corresponds to the end of an instruction. The instructions are thus aligned with the word boundaries.

The arithmetic and logic unit 10 is notably configured to execute one after the other the instructions loaded into the queue 22. The instructions loaded into the queue 22 are generally systematically executed in the order in which these instructions were recorded in this queue 22. The arithmetic and logic unit 10 is also able to record the result of these executed instructions in one or more of the registers of the set 12.

In this description, "execution by the microprocessor 2" and "execution by the arithmetic and logic unit 10" will be used synonymously.

The module 14 is configured to transfer data between the set 12 of registers and the interface 16. The interface 16 is notably capable of acquiring data and instructions, for example from the memory 4 and/or the medium 6 that are external to the microprocessor 2.

In this embodiment example, the set 12 includes general registers that can be used to store any type of data and dedicated registers. Unlike the general registers, the dedicated registers are dedicated to the storage of specific data generally generated automatically by the microprocessor 2. Here, mention will be made of the existence among these dedicated registers of a register 13 which contains a value that varies according to the condition of a conditional branch. More specifically, the value of this register is not the same depending on whether this condition is true or false. For example, here, this register 13 is the status register. In an ARM architecture, this register 13 is known by the acronym CPSR ("Current Program Status Register"). The CPSR notably contains the following bits:
the bit N which takes the value "1" if the result of the condition is negative and, the value "0" otherwise,
the bit Z which takes the value "1" if the result of the condition is zero and "0" otherwise,
the bit C which takes the value "1" if the result of the condition has a carry digit and, otherwise, takes the value "0" and
the bit V which takes the value "1" if the result of the condition has overflowed and, otherwise, takes the value "0".

The value of these four bits N Z, C and V is collectively denoted by the term "NZCV value" below.

The microprocessor 2 here includes a data interchange bus 24 which connects the various components of the microprocessor 2 to one another.

The medium 6 is typically a non-volatile memory. For example, it is a memory of the EEPROM or Flash type. Here, it contains a backup copy 40 of the binary code 30. Typically, it is this copy 40 that is automatically copied over into the memory 4 to restore the code 30, for example, after a power cut or the like or just before the execution of the code 30 starts.

The machine codes 32 and 34 do not perform the same operations when they are executed by the microprocessor 2. However, they detect execution faults by the same technique. This technique is only described in detail below in the case of the machine code 32, with the knowledge that it is implemented similarly in the machine code 34.

The machine code 32 consists of a succession of basic blocks which must be executed one after the other. The next part of this description explains how the following aims are achieved:

Aim 1): detecting an execution fault within a basic block and, at the same time, and Aim 2): detecting a modification of the integrity of the control flow.

Figure 2:
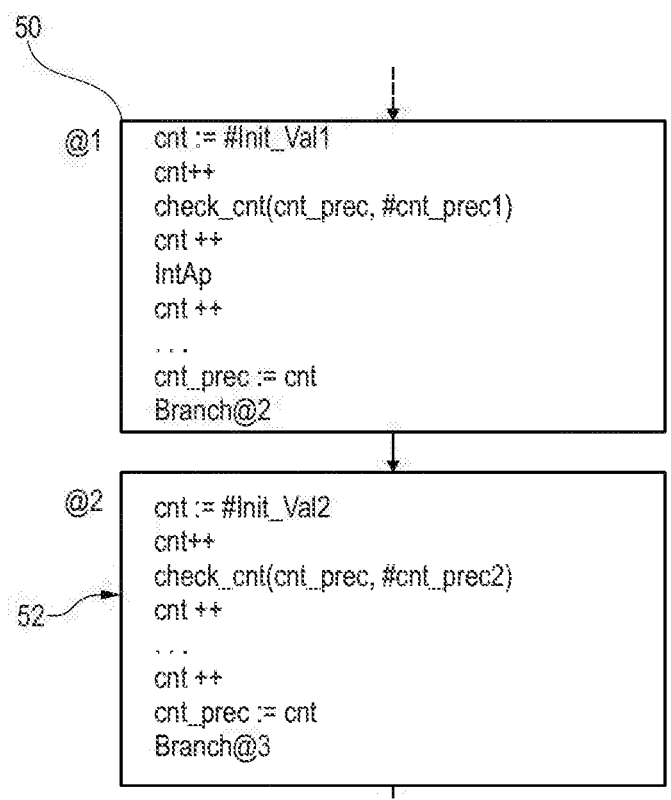

FIG. 2 shows how aims 1) and 2) are achieved in the case of two basic blocks 50 and 52 of the machine code 32 which must systematically be executed one after the other. In the order of execution, the basic block 50 precedes the basic block 52. In this figure and the subsequent figures:

the order of execution of the basic blocks is represented by an arrow which points from the preceding basic block to the subsequent basic block, a dashed arrow pointing to a depicted basic block indicates that the one or more basic blocks preceding that basic block have not been depicted in order to simplify the figure, and a dashed arrow which points from a depicted basic block into empty space indicates that the one or more basic blocks following that depicted basic block have not been depicted in order to simplify the figure.

Each basic block starts with a branch address and ends with a branch instruction. In FIG. 2, the symbols "@1" and "@2" next to the first instruction of each basic block denote the branch addresses of the basic blocks 50 and 52, respectively. The symbol "@3" denotes the branch address of another basic block not depicted in FIG. 2.

The "Branch" instruction followed by a branch address such as @2 or @3 is an unconditional instruction to branch to this branch address. In the subsequent figures, in order to simplify the depiction of the basic blocks, the branch addresses and the branch instructions of the basic blocks have not always been depicted.

The first instructions "cnt:=#Init_Val1" and "cnt:=#Init_Val2" of the basic blocks 50 and 52, respectively, are instructions which initialize the value of a counter "cnt" to a predetermined initial value, #Init_Val1 and #Init_Val2, respectively. These initial values are constants chosen during the generation of the machine code 32. A constant value is a value that cannot be modified during the execution of the machine code 32 except in an unintended manner as, for example, in the case of a fault injection. In the figures and in the description, the symbol #Init_Val is used to denote in general terms the initial value of a counter of a basic block. When there is a need, in the description or the figures, to distinguish various initial values from one another, the symbol #Init_Val is followed by a serial number which makes it possible to distinguish the various initial values. For example, in FIG. 2, the symbols "#Init_Val1" and "#Init_Val2" are used to distinguish the two initial values of the counters of blocks 50 and 52.

Here, the initial value of the counter "cnt" of each basic block is chosen such that the expected value of the signature of that basic block is unique for each basic block of the machine code 32. "Unique for each basic block" means that the probability that two basic blocks of the machine code 32 have the same expected value for their respective signature is less than 1 in 100 or in 1000. In practice, the probability that two basic blocks have the same expected value is generally much smaller. For example, preferably, this probability is less than $N_{va}/2^{c-1}$ or $N_{va}/2^c$, where $N_{va}$ is the number of expected values used in the machine code, and "c" is the number of bits used to encode the maximum value of the counter "cnt" in binary. In particular, the expression "unique for each basic block" thus covers the case in which the expected values of the signatures of all the basic blocks are always different from one another. Here, during the generation of the machine code 32, the initial value of the counter "cnt" of each basic block is obtained by random or pseudorandom drawing from a group of numbers a hundred times or a thousand times larger than the number of basic blocks of the machine code 32.

The "cnt++" instruction is an instruction that increments the current value of the counter "cnt" by 1 when executed by the microprocessor 2. This instruction is used here, as the microprocessor 2 executes a basic block, to construct the value of the signature associated with this basic block. For this reason, this "cnt++" instruction is also known as the "signature construction instruction" of the basic block.

The final constructed value of the signature of a basic block is recorded, before the start of the execution of the subsequent basic block, in a variable "cnt_prec". This operation is depicted in the figures by the "cnt_prec:=cnt" instruction.

In order to be able to detect a fault during the execution of the instruction to be protected, each instruction to be protected is closely associated with a respective "cnt++" instruction. "Closely associated" means that the association between the instruction to be protected and the "cnt++" instruction is such that if the instruction to be protected is loaded into the queue 22, then the "cnt++" instruction associated therewith is systematically also loaded into the queue 22 at the same time. To achieve this, each "cnt++" instruction is encoded on strictly less than N bits. Here, the "cnt++" instruction is encoded on 16 bits. Then, when compiling the source code, each time the compiler encounters an instruction to be protected, it inserts at least one "cnt++" instruction either immediately before or immediately after the instruction to be protected. More specifically, as will be explained in more detail with reference to FIG. 7, the compiler chooses to insert "cnt++" instructions such that there is always an N-bit word that contains both:

all or part of the instruction to be protected and a "cnt++" instruction.

Thus, when the loader 18 loads this instruction to be protected into the queue 22, as it can only load complete words, it necessarily also loads the "cnt++" instruction that is associated with this instruction to be protected. Conversely, if, by acting on the execution of the machine code 32, the loading of the instruction to be protected is prevented, this prevention also necessarily causes, a "cnt++" instruction associated therewith not to be loaded. Hence, as explained below, even the skipping of a single instruction to be protected in the machine code is detected and triggers the reporting of a fault.

In, the symbolic form of the machine code of the basic blocks that is depicted in the figures, the "cnt++" instruction closely associated with an instruction to be protected is systematically placed immediately before this instruction to be protected. However, as explained above, this "cnt++" instruction can in actual fact be located either immediately before or after the instruction to be protected in the machine code.

In the basic block 50, an example of an instruction to be protected is represented by the symbol "IntAp". The IntAp instruction can be any valid instruction from the instruction set of the microprocessor 2 other than the "cnt++" instruction.

The "check_cnt(cnt_prec, #cnt_prec1)" instruction is a set of instructions to be protected, the specific role of which is explained later on.

In this embodiment, all the instructions of all the basic blocks of the machine code 32 are considered to be instructions to be protected. To simplify FIGS. 2 to 5, the presence of these other instructions to be protected in each basic block and of the "cnt++" instructions associated therewith are represented by the symbol " . . . ".

The "check_cnt(cnt_prec, #cnt_prec1)" instruction is an instruction set known as a comparison instruction set. An instruction set denotes both a single instruction and a group of several inscriptions of the machine language to be executed one after the other.

When this comparison instruction set is executed by the microprocessor 2, the constructed value cnt_prec for the signature of the preceding basic block is compared with an expected value #cnt_prec1 for this signature. The expected value #cnt_prec1 is a constant determined during the generation, by the compiler of the machine code 32. Typically, during compilation, the expected value #cnt_prec1 is calculated based on:

the initial value #Init_Val1 assigned to the preceding basic block, and the number of "cnt++" instructions inserted into this preceding basic block.

Similarly to what has been described for the symbol #Init_Val, in the figures and in the description, the symbol #cnt_prec is used to denote in general terms the expected value of a signature. When there is a need, in the description or the figures, to distinguish various expected values from one another, the symbol #cnt_prec is followed by a serial number which makes it possible to distinguish the various expected values. For example, in FIG. 2, the symbols "#cnt_prec1" and "#cnt_prec2" are used to distinguish the two expected values for the signatures of the preceding basic blocks, blocks 50 and 52, respectively.

During the execution of the basic block 50, each time the instruction to be protected is executed, this is reflected by an incrementation of the value of the counter "cnt". At the end of the execution of the basic block 50, the value of the counter "cnt" is saved in the variable "cnt_prec". The variable "cnt_prec" therefore contains the constructed value of the signature for the basic block 50.

Then, during the execution of the basic block 52, the microprocessor 2 compares the constructed value of the basic block 50 with the expected value #cnt_prec2. If no instruction to be protected in the basic block 50 has been skipped or altered, these values are identical and the execution of the basic block 52 continues. If an instruction to be protected in the basic block 50 has been skipped or altered, the constructed value cnt_prec is different from the expected value #cnt_prec2. In this case, the microprocessor 2 reports the presence of a fault during the execution of the machine code. The reporting of a fault is then, for example, used to automatically trigger one or more countermeasures.

Choosing an initial value #Init_Val for each counter "cnt" of a basic block that results in a unique expected value #cnt_prec also makes it possible to detect and report a fault if the integrity of the control flow is corrupted. For example, in the case of FIG. 2, the basic block 52 must necessarily be, executed immediately after the basic block 50. If, as a consequence of a fault injection attack, the execution of the basic block 52 is triggered not after the execution of the basic block 50 but after the execution of another basic block of the machine code 32, this will necessarily trigger reporting of a fault. In particular, this reporting will take place even if this other basic block includes exactly the same number of instructions to be protected as the basic block 50. This is because, by means of construction, this other basic block initializes the value of the counter "cnt" to an initial value different from that used by the basic block 50. Consequently, the constructed value of the signature of this other basic block will certainly be different from the value #cnt_prec expected by the basic block 52. Thus, the machine code 32 makes it possible both to detect execution faults within a basic block and, at the same time, to detect modifications of the integrity of the control flow.

Figure 3:
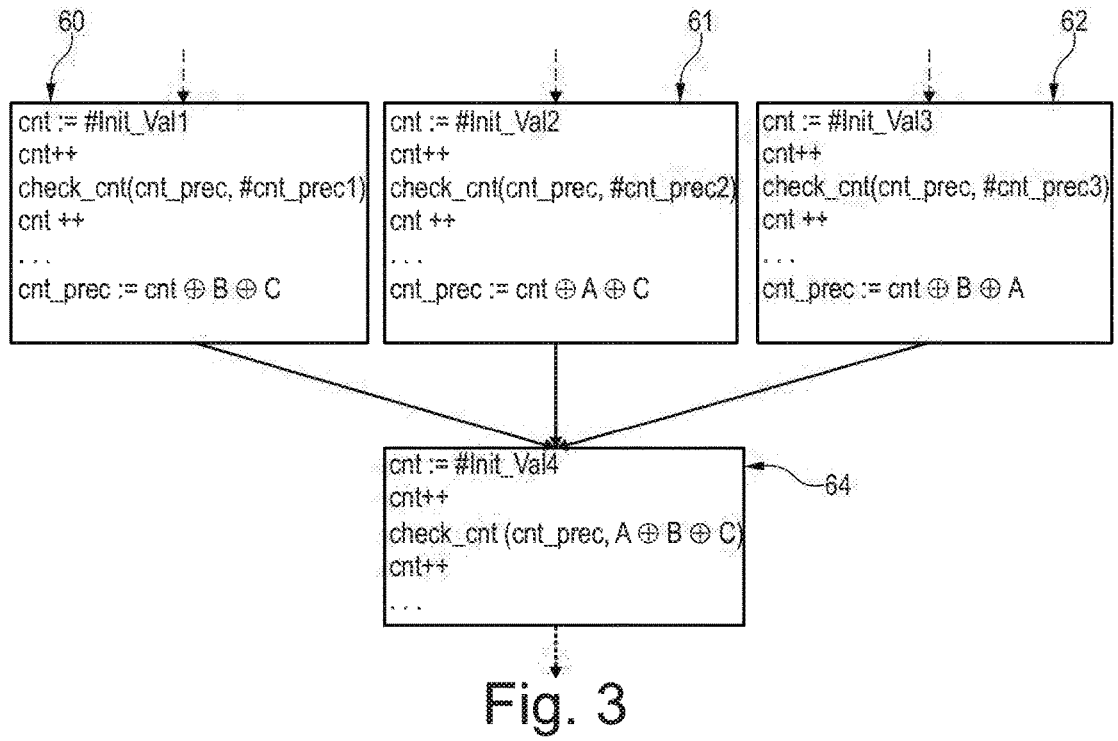

FIG. 3 shows how the signatures of several preceding basic blocks are constructed when, regardless of the preceding basic block executed, the subsequent basic block is always the same. The solution is illustrated here in the specific case of three preceding basic blocks 60 to 62 and a subsequent basic block 64. However, the implementation described here can be applied without any difficulty to any number of preceding basic blocks.

Before the basic block 64 is executed, just one of the basic blocks 60 to 62 is executed. The choice of the block 60 to 62 that will be executed typically depends on the context of execution of the secure function, that is to say on the data that are processed by the machine code 32. These data processed may vary from one execution of the machine code 32 to the next.

In FIG. 3 and the subsequent figures, the description of the symbols and instructions already given with reference to a preceding figure is omitted.

In the case of FIG. 3, if the signature of the basic blocks 60 to 62 were constructed as described in the case of FIG. 2, then the constructed values for the signatures of the basic blocks 60 to 62 would all be different. This then greatly complicates the implementation of the comparison instruction set of the basic block 64 since it is then necessary to test all the expected values of the signatures of the preceding basic blocks.

In FIG. 3, the comparison instruction set of the basic block 64 is represented by the symbol "check_cnt(cnt_prec, A⊕B⊕C)". In order for the "check_cnt(cnt_prec, A ⊕B ⊕C)" instruction set to be as simple as that of FIG. 2, the constructed value cnt_prec of the signature of each of the basic blocks 60 to 62 is constructed by combining the value of the counter "cnt" with anticipated values A, B and C for the signatures of the other preceding basic blocks. The anticipated value of a basic block is the value obtained after the microprocessor 2 has executed each of the "cnt++" instructions contained in this basic block. For this purpose, a combinational instruction set is placed inside each basic block 60 to 62. The combination here consists of "exclusive ORing" or XORing the current value of the counter "cnt" and the anticipated values for the signatures of the other preceding basic blocks.

In FIG. 3 and in this text:
the XOR operation is represented by the symbol ⊕,
the anticipated values for the basic blocks 60 to 62 are denoted by the symbols A, B and C, respectively.

In FIG. 3 and the subsequent figures, the unconditional branch instructions are not shown.

Using this notation, the combinational instruction sets for obtaining the final value cnt_prec constructed for the signatures of the basic blocks 60 to 62 are, respectively:
"cnt_prec:=cnt ⊕B⊕C",
"cnt_prec:=cnt ⊕A ⊕C",
"cnt_prec:=cnt ⊕B ⊕A".

These combinational instruction sets are shown in FIG. 3 at the end of each of the basic blocks 60 to 62.

Constructing the value of the signature of the basic blocks 60 to 62 in this way means that when no instruction of this basic block is skipped or altered, the constructed value of the signature is the same regardless of the previously executed basic block. Hence, the "check_cnt(cnt_prec, A⊕B⊕C)" comparison instruction set is the same as that described with reference to FIG. 2, except that the expected value #cnt_prec of the signature is equal to the XORed combination of the anticipated values A, B and C. In FIG. 3, the expected value #cnt_prec is denoted "A⊕B⊕C". This makes it possible to detect any modification of at least one bit of the signature of any of the basic blocks 60 to 62.

Figure 4:
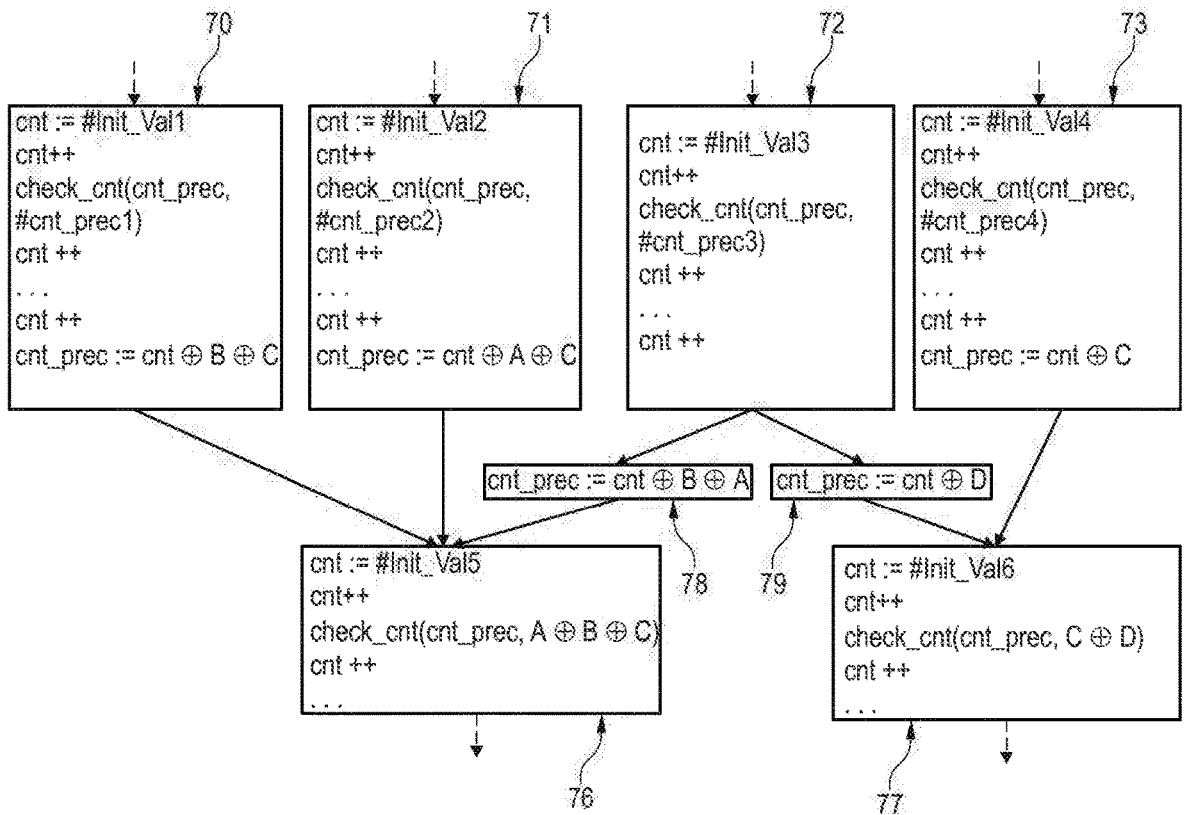

FIG. 4 shows how the signatures of several preceding basic blocks are constructed when there are also several different subsequent basic blocks that may 20 each be executed immediately after one of these preceding basic blocks. This situation is illustrated in FIG. 4 in the, specific case of four preceding basic blocks 70 to 73 and two subsequent basic blocks 76 to 77. The basic blocks 70 and 71 precede only the basic block 76. The basic block 73 precedes only the basic block 77. The execution of the basic block 72 can be followed by the execution of the basic block 76 and, alternately, the basic block 77.

The anticipated values for the signatures of the basic blocks 70 to 73 are denoted A, B, C and D, respectively. In accordance with what has been described in the case of FIG. 3, the values expected by the basic blocks 76 and 77 are A⊕B⊕C⊕D, respectively.

The constructed value cnt_prec for the signature of the basic blocks 70, 71 and 73 is constructed as described in the case of FIG. 3. However, the constructed value for the signature of the basic block 72 cannot be constructed as taught in the case of FIG. 3. This is because, when no instructions are skipped or altered, the constructed value of the signature of the basic block 72 must:
be equal to cnt ⊕B⊕C if the execution continues with the execution of the basic block 76, and
be equal to cnt ⊕D if the execution continues with the execution of the basic block 77.

To overcome this difficulty, during the generation of the machine code, the compiler automatically introduces two additional intermediate basic blocks 78 and 79 into the machine code 32 and modifies the conditional branch located at the end of the basic block 72.

More specifically, in the conditional branch located at the end of the basic block 72, the branch addresses of the basic blocks 76 and 77 are replaced by the branch addresses of the basic blocks 78 and 79, respectively.

The basic block 78 comprises the "cnt_prec:=cnt ⊕B⊕A" instruction which constructs the value of the signature of the block 72 when the execution continues with that of the basic block 76. The end of the basic block 78 includes an unconditional instruction to branch to the branch address of the basic block 76.

Similarly, the basic block 79 includes the "cnt_prec:=cnt⊕D" instruction which constructs the value of the signature of the basic block 72 when the execution continues with that of the basic block 77. The end of the basic block 79 includes an unconditional instruction to branch to the branch address of the basic block 77.

Preferably, the instructions of the basic blocks 78 and 79 are protected. For example, the two instructions "cnt_prec:=cnt ⊕B⊕A" and "cnt_prec:=cnt ⊕D" are each closely associated with an instruction that increments the value of the cnt_prec.

FIG. 5 shows a case similar to that of FIG. 4, modified to take into account the current context of execution of the secure function. Indeed, in the case of FIG. 4, the solution described makes it possible to check that the basic block 72 is actually a basic block preceding the basic blocks 76 and 77. However, the solution described does not make it possible to report a fault if a branch to the basic block 76 is executed whereas, in the current context of execution, it, is a branch to the basic block 77 which should normally have been executed. The implementation described in FIG. 5 makes it possible to report such an execution fault. This is because, when checking the validity of the conditional branch to a subsequent basic block, the current context of execution is taken into account.

The implementation of FIG. 5 is described in the specific case of a preceding basic block 82 which is followed by two subsequent basic blocks 84 and 85. The basic block 82 includes a conditional branch instruction "branch cond, @88, @89". When said conditional branch instruction is executed, if the condition "cond" is true, the execution continues only with the execution of the basic block 84. Otherwise, the execution is only directed toward the basic block 85. In this figure, the symbol @X denotes the branch address of the basic block bearing the numerical reference X.

FIG. 5 also includes two additional basic blocks 88 and 89. During the generation of the machine code 32, these basic blocks 88 and 89 are automatically inserted between the block 82 and the blocks 84 and 85, respectively. For this purpose, the conditional branch at the end of the block 82 is replaced by the conditional branch "branch cond, @88, @89" which directs the execution directly toward the address @88 if the condition "cond" is true and, otherwise, toward the address @89.

The basic block 88 stores the NZCV value expected when the condition "cond" is true. The expected NZCV value is a constant determined during the generation of the machine code 32. Here, this role is performed by the "cnt[flags]:=#cond_true" and "cnt[mask]:=#cond_true_mask" instructions, where #cond_true and #cond_true_mask are constants the values of which were determined during the generation of the machine code 32. More specifically, when executed by the microprocessor 2, the "cnt[flags]:=#cond_true" instruction records the NZCV value expected when the condition "cond" is true.

However, depending on the condition to be checked, only some of the bits of the NZCV value are useful and the values of the other bits must be ignored. For this purpose, a mask identifying the position of the useful bits is also stored. Just like the expected NZCV value, this mask is determined during the generation of the machine code 32. Here, this storing operation is represented by the "cnt[mask]:=#cond_true_mask" instruction in FIG. 5.

Here, the "cnt[flags]:=#cond_true" and "cnt[mask]::=#cond_true_mask" instructions are treated as instructions to be protected. Thus, they are each associated with a "cnt++" instruction.

Moreover, in this specific case of implementation, the "cnt_prec:=cnt" instruction is located at the end of the basic block 88 and not at the end of the basic block 82. Thus, the constructed value of the signature of the basic block 82 also takes into account the "cnt[flags]:=#cond_true" and "cnt[mask]:=#cond_true_mask" instructions.

The basic block 88 ends with an unconditional instruction to branch to the address @84.

The basic block 89 is identical to the basic block 88 except that:
the "cnt[flags]:=#cond_true" and "cnt[mask]:=#cond_true_mask" instructions are replaced by "cnt[flags]:=#cond_false" and "cnt[mask]:=#cond_false_mask" instructions, respectively, and
in the unconditional branch instruction, the address @84 is replaced by the address @85.

The "cnt[flags]:=#cond_false" and "cnt[mask]:=#cond_false_mask" instructions, when executed by the microprocessor 2, store in the same memory space the NZCV value expected when the condition "cond" is false and the value of the mask that selects the useful bits of the expected NZCV value, respectively.

In this embodiment, as shown in, FIG. 6, the, expected NZCV value, the mask and the value of the variable cnt_prec are stored in the same N-bit register of the set 12. For example, the value of the variable cnt_prec occupies the 24 least significant bits, the expected NZCV value is stored in the 4 most significant bits and the value of the mask is stored in the 4 bits of intermediate significance. The 24-bit range and the 4-bit ranges corresponding to the values of the variable cnt_prec, the NZCV value and the mask are denoted in FIG. 6 by the symbols "cnt_prec[flags]", "cnt_prec[mask]" and "cnt_prec[counter]", respectively.

The basic blocks 84 and 85 each comprise:
an "nzcv:=mrs CPSR" instruction which loads the NZCV value currently contained in the CPSR register into a variable nzcv,
a first comparison instruction set "check_cnt(cnt_prec[counter], #cnt_prec)", and
a second comparison instruction set "check_cond (cnt_prec[flags], cnt_prec[mask], nzcv)".

When executed by the microprocessor 2, the first comparison instruction set compares the constructed value cnt_prec[counter] for the signature of the preceding basic block with the expected value #cnt_prec established during the generation of the machine code 32. A fault in the execution of the machine code 32 is reported only if the values do not correspond. Otherwise, no fault is reported.

When executed by the microprocessor 2, the second comparison instruction set compares the values of the useful bits of the variable nzcv with the expected values for these same, bits. A fault in the execution of the machine code is reported only if the values do not correspond. Otherwise, no fault is reported. For this comparison, only the bits selected using the mask stored in the range cnt_prec[mask] are used. The expected nczv value is the value stored in the range cnt_prec[flags].

During normal execution of the machine code 32, if the condition "cond" is false, then the execution of the machine code 32 must continue with the execution of the basic block 89. However, due to a fault injection attack at the moment at which the conditional branch is executed, the execution may, in this context of execution, continue in an unintended manner with the execution of the basic block 88 instead of the basic block 89. In this case, the expected nzcv value corresponds to the case in which the condition "cone" is true, while the value of the variable nzcv corresponds to the case where the condition "cond" is false. This contradiction is detected during the execution of the second comparison instruction set and a fault is reported. Thus, the context of execution is taken into account in order to detect a modification of the integrity of the control flow.

FIG. 7 shows the arrangement of the instructions of the machine code 32 that is implemented in order to closely associate the instructions to be protected with the "cnt++" instructions.

The dashed vertical lines represent the division of the machine code 32 into a succession of words of N bits each. It will be recalled that N is the loading size here. In this example, the loading size is equal to 32 bits. Only eight words 100 to 107 of the machine code 32 are shown in FIG. 7. The following notation is used in FIG. 7:
"cnt++" denotes the 16 bits that encode the "cnt++" instruction,
"intr16" denotes the 16 bits that encode, an instruction to be protected encoded on 6 bits,
"inst32" denotes the 32 bits that encode an instruction to be protected encoded on 32 bits.

As indicated above, the machine code 32 contains both instructions to be protected encoded on 16 bits and instructions to be protected encoded on 32 bits.

One horizontal bar 110 represents a first arrangement of the instructions of a machine code where the association between each instruction to be protected (114, 118, 122 and 126) and the "cnt++" instruction (113, 116, 120, 124, 128) is achieved by systematically inserting the "cnt++" instruction immediately before the instruction to be protected with which it needs to be associated. In this figure, the order of execution of the machine code is represented by a horizontal arrow going from left to right. The terms "before" and "after" are defined below with respect to the order of execution of the machine code.

In the case of the arrangement 110, not every instruction to be protected is systematically closely associated with a "cnt++" instruction. Indeed, there may be words that contain only one instruction to be protected. In FIG. 7, this is illustrated in the case of the instruction 114 contained within the word 103. The instruction 114 is associated with the "cnt++" instruction 113 contained within the preceding word 102. If an attack causes only the word 103 to be skipped, this does not prevent the word 102 from being loaded. The "cnt++" instruction 113 is therefore executed and the constructed value of the signature is identical to the expected value. The skipping of the instruction 114 is therefore not detected.

One horizontal bar 112 represents a second arrangement of the instructions, which is implemented in the machine code 32 and makes it possible to systematically closely associate each instruction to be protected with a "cnt++" instruction. For this purpose, during the generation of the machine code 32 by a compiler, this compiler by default inserts the "cnt++" instruction immediately before the instruction to be protected unless this leads to the generation of a word which only contains bits of the instruction to be protected. In the latter case, the compiler automatically inserts an additional "cnt++" instruction immediately before this instruction to be protected in order to shift this instruction to be protected by 16 bits. As a result, each word of the machine code 32 containing bits of an instruction to be protected also necessarily includes the bits encoding the "cnt++" instruction. In the example shown in FIG. 7, the bars 110 and 112 are identical up to the word 103. At the word 103, placing a single "cnt++" instruction 113 immediately before the instruction 114 produces a word 103 containing only the 32 bits of the instruction 114. In order to avoid this, the compiler automatically inserts a second additional "cnt++" instruction 130 immediately before the instruction 114. Then, in order to prevent the word 106 from containing only the bits encoding the instruction to be protected 122, the compiler automatically inserts an additional "cnt++" instruction 132 immediately before this instruction 122.

Figure 8:
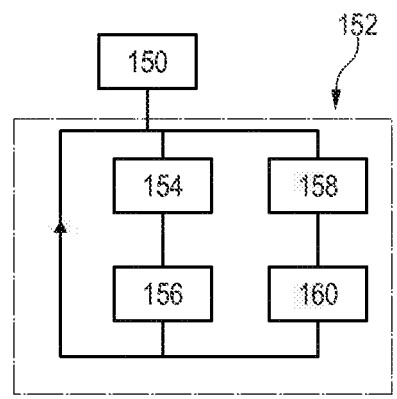
FIG. 8 is a flowchart of a method of execution of the machine code of a secure function.

FIG. 8 shows a method of execution of the binary code 30 by the microprocessor 2.

The method starts with a step 150 of supplying the binary code 30 in the memory 4. For this purpose, for example, the microprocessor 2 copies over the copy 40 into the memory 4 in order to obtain the binary code 30 recorded in the memory 4.

Then, during a step 152, the microprocessor 2 executes the binary code 30 and, in particular, the machine code 32. For this purpose, the loader 18, during an operation 154, loads the instructions to be executed one after the other into the queue 22.

Then, during an operation 156, the arithmetic and logic unit 10 executes each one of the instructions loaded into the queue 22 in the order in which they were loaded.

During this loading, the loader 18 only loads complete words. Thus, an instruction to be protected or part of an instruction to be protected cannot be loaded into the queue 22 without the "cnt++" instruction associated therewith being loaded at the same, time. By virtue of this, the execution of an instruction to be protected cannot easily be altered without causing a "cnt++" instruction to be altered at the same time. It is therefore possible, by virtue of the arrangement of the instructions of the machine code 32 that is described with reference to FIG. 7, to detect faults as small as a fault in a single machine instruction to be protected.

During the execution, of the machine code 32, if attacks lead to alteration of an instruction to be protected or to modification of the control flow, the microprocessor 2, during an operation 158, reports a fault in the execution of the machine code 32.

In response to such a report, during an operation 160, the microprocessor 2 implements one or more countermeasures. A very large number of countermeasures are possible. The countermeasures implemented may have very varied degrees of severity. For example, the countermeasures implemented may range from the simple displaying of an error message without interrupting the normal execution of the machine code 32 through to definitive shutdown of the microprocessor 2. The microprocessor 2 is considered to be shut down when it is definitively put into a state in which it is unable to execute any machine code. In between these extreme degrees of severity, there exist numerous other possible countermeasures, such as:

indicating the detection of the faults via a human-machine interface, immediately interrupting the execution of the machine code 32 and/or reinitializing it, and erasing the machine code 32 from the memory 4 and/or erasing the backup copy 40 and/or erasing the secret data.

FIG. 9 shows the interactions between the machine codes 32, 34 and 36. The implementation described here makes it possible to make the calls between secure functions secure. Indeed, a call to a secure function corresponds to the execution of an instruction to branch to a branch address of a basic block of the secure function called. To illustrate this, in FIG. 9, the branch instruction of the machine code 34 that calls the machine code 32 is represented by the "f(IDF)" instruction. The branch address which the "f(IDF)" instruction refers to is denoted @1 in FIG. 9.

At the end of the execution of the machine code 32, the execution of a branch instruction redirects the control flow to an address @33 of the machine code 34. Then the execution of the machine code 34 continues. This branch instruction is denoted "return(IDR)" in FIG. 9. In order to make the call to the machine code 32 secure, the machine code 34 transmits an identifier IDF to the machine code 32 during this call. Then, the execution of the machine code 32 starts by checking that the transmitted value of the identifier IDF does indeed correspond to an expected value #IDF. The value #IDF is a constant determined during the generation of the machine code 32. Only if the transmitted and expected values do not correspond does the microprocessor 2 trigger the reporting of a fault in the execution of the machine code 32. Otherwise, that is to say if these values do correspond, the execution of the machine code 32 continues without triggering this reporting of a fault.

In FIG. 9, the validation instruction set that performs this operation when executed by the microprocessor 2 is denoted "check(IDF, #IDF)". This implementation makes it possible to trigger the reporting of a fault if, as a consequence of a fault injection attack, the control flow is modified and redirected toward the address @1 without the f(IDF) instruction having been executed beforehand. This is because, in this case, no identifier IDF is transmitted to the machine code 32, or else the transmitted value of the identifier IDF is incorrect.

Similarly, at the end of the execution of the machine code 32, the "Return(IDR)" instruction transmits an identifier IDR to the machine code 34 at the same time as redirecting the execution of the machine code toward the address @33. Then, the machine code 34 checks whether the transmitted value of the identifier IDR corresponds to an expected value #IDR of this identifier. This checking leads to the reporting of a fault being triggered only if the transmitted value and the expected value for the identifier IDR do not correspond. The expected value #IDR is constructed during the generation of the machine code 34. In FIG. 9, the instruction set of the machine code 34 that performs this checking is denoted "check(IDR, #IDR)".

In this embodiment, the machine code 32 may also legitimately be called by the machine code 36. Unlike the machine code of a secure function, the machine code 36 cannot transmit the identifier IDF during the execution of a branch to the machine code 32. For example, the machine code 36 has been generated by a third party independently of the machine code 32. Hence, in order to prevent a fault from being reported each time the machine code 36 calls the machine code 32, the machine code 32 includes two different entry points. The first entry point corresponds to the branch address @1. This first entry point is systematically used to call the machine code 32 from the machine code of a secure function. When the first entry point is used, the "check(IDF, #IDF)" instruction set is executed. For this purpose, the address @1 is located before or at the start of the "check(IDF, #IDF)" instruction set.

The second entry point corresponds to a branch address @2 which is located just after the "check(IDF, #IDF)" instruction set. The second entry point is systematically used to call the machine code 32 from the machine code of a non-secure function. When the second entry point is used, the "check(IDF, #IDF)" instruction set is not executed, such that the call to the machine code 32 by the machine code 36 does not trigger the reporting of a fault.

The fact that the identifier IDR is transmitted to the machine code 36 when the execution of the machine code 32 returns to the machine code 36 does not in any way disrupt the functioning thereof. This is because the machine code 36 does not have a "check(IDR, #IDR)" instruction. To this end, it will be ensured, for example, that the expected value IDR is stored in a register typically known as a "caller saved register" or a "scratch register", that is to say a register that can be freely used in the called code (machine code 32) and the value of which does not need to be preserved upon returning to the calling code 36 after execution of the code 32.

Typically, each instruction of the "f(IDF)", "check(IDF, #IDF)", "return(IDR)" and "check(IDR, #IDR)" instruction sets is treated, during the generation of the machine codes 32, 34, as, an instruction to be protected, with the result that it is difficult, if not impossible, to alter these instructions without triggering the reporting of a fault.

Figure 10:
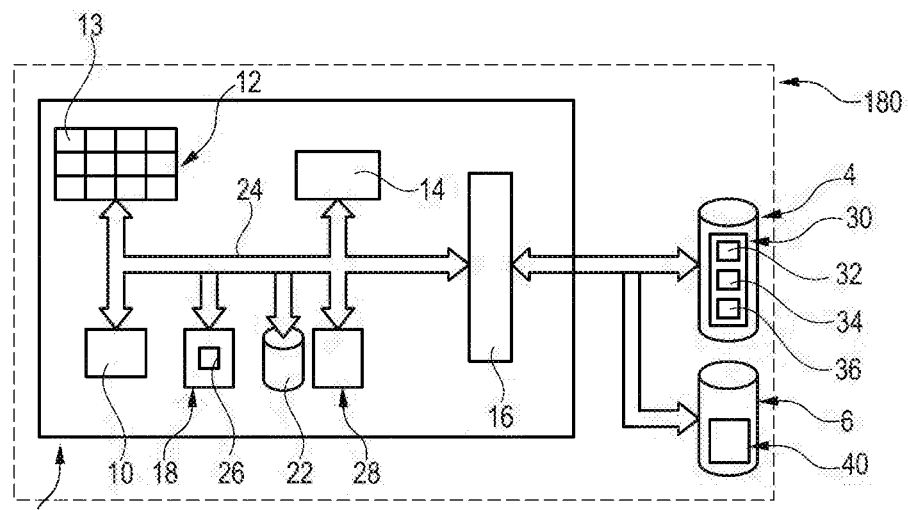
FIG. 10 is a schematic illustration of the architecture of another possible embodiment of an electronic device capable of executing the machine code of a secure function.

FIG. 10 shows a device 180 identical to the device 1 except that the microprocessor 2 has been replaced by a microprocessor 182. The microprocessor 182 is identical to the microprocessor 2 except that it additionally includes a hardware security module 28. The module 28 is able to automatically execute the following operations in place of the arithmetic and logic unit 10:

1) in response to the loader 18 loading the "cnt++" instruction, the module 28 modifies the value of the counter "cnt" in a predetermined manner,
2) in response to the loader 18 loading a "check(cnt_prec, #cnt_prec)" instruction, the module 28 compares the constructed value cnt_prec with the expected value #cnt_prec and, if these values are not identical, triggers the reporting of a fault, and
3) in response to the loader 18 loading a "cnt:=Init_Val" instruction, the module 28 initializes the value of the counter "cnt" to the value "Init_Val".

Thus, in this embodiment, the operations for constructing the value of the signature of a basic block and for checking this signature are performed not by the arithmetic and logic unit 10 but by the module 28. By virtue of this, each "check(cnt_prec, #cnt_prec)" instruction set may correspond to a single instruction in the machine code, which instruction, when loaded by the loader 18, triggers the checking of the signature of the preceding basic block by the module 28. This makes it possible to speed up the execution of the secure function and limits the memory size of the machine code of this secure function.

Figure 11:
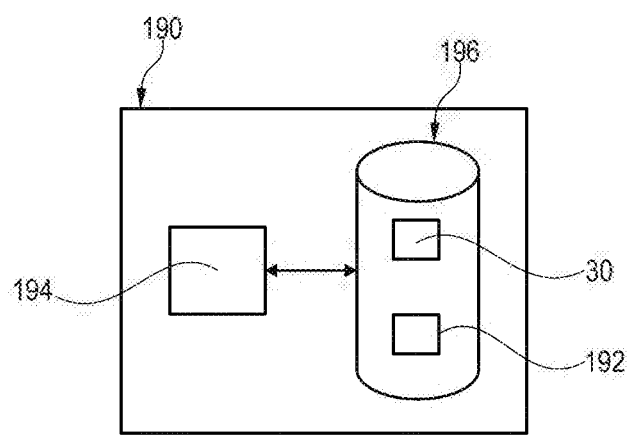
FIG. 11 is a schematic illustration of a compiler capable of generating the machine code executed by the device of FIG. 1 or 10.

FIG. 11 shows a compiler 190 capable of automatically generating the machine code 32 from a source code 192. To this end, the compiler 190 typically includes a programmable microprocessor 194 and a memory 196. The memory 196 contains the instructions and data necessary for automatically generating, when executed by the microprocessor 194, the machine code 32 from a source code 192. In particular, during the compilation of the source code 192, the microprocessor 194 automatically introduces the "cnt++", "cnt:=#Init_Val" and "check_cnt(cnt_prec, #cnt_prec)" instructions into the machine code 32. Moreover, the microprocessor 194 automatically arranges the "cnt++" instructions of the machine code generated as described with reference to FIG. 7. A person skilled in the art will be capable of designing and producing a compiler of this kind on the basis of the explanations given in this description.

Variants of the Binary Code:

In order to construct the signature of a basic block during its execution, the construction instruction is not always necessarily an instruction to increment by a predetermined step. In fact, the construction instruction may be any instruction that is encoded on less than one word, can be executed by the microprocessor 2 or the module 28 and, each time it is executed, makes it possible to modify the value of the signature in a predetermined manner. For example, in a first variant, one in two "cnt++" instructions is replaced with an instruction to decrement by a predetermined step. Preferably, the increment and decrement steps are different in this case. The "cnt++" instruction may also systematically be replaced with a decrement instruction or an instruction that executes a modular arithmetic operation such as a multiplication, an addition or a division. In another variant, each time it is executed, the "cnt++" instruction triggers the generation, by a pseudorandom number generator, of a new pseudorandom number which is then recorded in the counter "cnt" in place of its previous value. In addition, the "cnt:=#Init_Val" instruction, when executed, triggers the initialization of this pseudorandom number generator with the predetermined initial value #Init_Val.

The uniqueness of the expected value for each basic block can be ensured by means other than simple random drawing. For example, during the generation of the machine code, the expected value of the signature of each basic block is established on the basis of the expected values already used for other basic blocks.

For this purpose, by way of illustration, the following operations are executed in order during the generation of the machine code:

a) The expected value for the basic block currently being processed is first of all constructed by randomly drawing the initial value of the counter as described above.
b) The expected value of the signature of the basic block currently being processed is calculated and then compared with the expected values constructed and stored for the basic blocks that have already been processed.
c) If the expected value of the basic block currently being processed is equal to one of the expected values that have already been constructed and stored, operations a) to c) are repeated. Otherwise, the expected value constructed for this basic block currently being processed is stored.

In a simplified variant, the "cnt:=#Init_Val" instruction systematically initializes the initial value of the counter "cnt" to the same value, regardless of the basic block within which it is located. All that is then, required for the expected values of the signatures of various basic blocks to be different is that the basic blocks do not always include the same number of instructions to be protected. Hence, this still allows a large number of modifications of the integrity of the control flow to be reported.

The comparison instruction set for comparing the constructed value with the expected value for a signature may be placed anywhere in the subsequent basic block, and not necessarily at the start of the subsequent basic block.

Each instruction of each basic block other than the "cnt++" instruction is not necessarily an instruction to be protected. Indeed, the execution of certain instructions, known as "non-critical" instructions, of a basic block may sometimes be altered without the security of the secure function being jeopardized. In this case there is no need to associate a "cnt++" instruction with these non-critical instructions.

The combinational instruction set may be placed anywhere within the basic block. In particular, it does not need to be placed at the end or after the last instruction to be protected in the preceding basic block.

Another solution for dealing with the case of FIG. 3 consists in:
replacing each of the "cnt_prec:=cnt⊕B⊕C", "cnt_prec:=cnt ⊕A⊕C" and "cnt_prec:=cnt⊕B⊕A" instructions with the "cnt_prec:=cnt" instruction, and
replacing the "check_cnt(cnt_prec, A⊕B⊕C)" comparison instruction set with the comparison instruction set: "If [(cnt_prec !=A) AND (cnt_prec !=AND (cnt_prec !=] then 'Trigger the reporting of an execution fault'".

In other words, in this variant, during the execution of the basic block 64, it is checked whether the value cnt_prec is different from each of the expected values A, B and C. If this is the case, an execution fault is reported. Otherwise, no execution fault is reported.

In the case of FIGS. 3 and 4, the combination of the constructed value of the signature with the anticipated values for the other preceding basic blocks is not necessarily performed using an XOR. For example, as a variant, the XOR is replaced with a modular arithmetic operation.

In the case of FIG. 5, the various values stored by the microprocessor 2 depending on whether or not the condition "cond" is true are not necessarily recorded in a register dedicated to this purpose. As a variant, these values, are recorded in any register of the set 12.

In another embodiment, the basic blocks 88 and 89 each include the "check_cnt(cnt_prec[counter], #cnt_prec)" and "check_cond(cnt_prec[flags], cnt_prec[mask], nzcv)" comparison instructions. In this case, before the "branch cond, @88, @89" instruction, the basic block 82 includes the "cnt_prec:=cnt" instruction for storing the constructed value for the signature of the basic block 82 in the variable cnt_prec. The basic blocks 88, 89 each start with an instruction to initialize the value of the counter "cnt" to respective initial values. Likewise, in this case, the constants #cnt_prec of the comparison instruction sets of the basic blocks 84 and 85 are equal to the expected values of the signatures of the basic blocks 88 and 89, respectively.

Another variant of the implementation of the case of FIG. 5 consists, as before, in placing before the "branch cond, @88, @89" instruction the "cnt_prec:=cnt" instruction for storing the constructed, value for the signature of the basic block 82 in the variable cnt_prec. Then, for storing the expected NZCV value, the "cnt[flags]:=#cond_true" and "cnt[mask]:=#cond_true" instructions are added within the basic block 84, for example after the "cnt:=#Init_Val1" instruction and before the "check_cond(cnt_prec[flags], cnt_prec[mask], nzcv)" instruction. Similarly, the "cnt[flags]:=#cond_false" and "cnt[mask]:=#cond_false_mask" instructions are added within the basic block 85, for example after the "cnt:=#Init_Val2" instruction and before the "check_cond(cnt_prec[flags], cnt_prec[mask], nzcv)" instruction. Preferably, these instructions added into the basic blocks 84, 85 are treated as instructions to be protected. In the latter variant, the insertion of the additional basic blocks 88 and 89 is omitted.

What has been described in the case of FIG. 5 may be applied to the case in which the condition "cond" is a complex condition, that is to say a condition that corresponds to more than two different NZCV values. For example, conditions involving opcodes that correspond to the conditions "≥" and "≤" are complex conditions. However, any complex condition can be broken down into a succession of simple conditions. A simple condition corresponds to just two different NZCV values. For example, the opcode "≥" may be replaced by a succession of two simple conditions, namely a condition that tests strict superiority and a condition that tests equality. After the complex condition has been transformed into a succession of simple conditions, the implementation described with reference to FIG. 5 may be carried out.

As a variant, the expected value of the condition is stored not in the same word that contains the expected value of the signature, but in a register of the microprocessor reserved for this purpose.

Instead of using the NZCV value, the status of the condition can also be recorded in any register of the set 12 or in a variable.

Variants of the Device:

The memory 4 may also be a non-volatile memory. In this case, there is no need to copy the binary code 30 into this memory before starting to execute it as it is already located there.

In a simplified embodiment, the module 28 performs only some, and not all, of operations 1), 2) and 3) described above.

The use of several entry, points to trigger the execution of a secure function may be implemented in any context in which a modification of the integrity of the control flow needs to be detected during a call between secure functions and does not need to be detected during a legitimate call from a non-secure function. In particular, this may be implemented independently of the implementation of the "cnt++", "cnt:=#Init_Val" and "check_cnt(cnt_prec, #cnt_prec)" instructions.

The invention claimed is:

1. A method of execution of a machine code of a secure function by a microprocessor, comprising:
   a) supplying the machine code, the machine code being formed by a succession of basic blocks in which:
      each basic block starts at a branch address and ends with an instruction to branch to a branch address of another basic block,
      each basic block is associated with a signature and includes instructions to be protected, each instruction to be protected being one of immediately preceded and followed by a construction instruction, the construction instruction, when executed by the microprocessor, modifies a current value of the signature associated with the basic block in a predetermined manner to obtain a new constructed value of the signature associated with the basic block,
      each subsequent basic block which, during the execution of the machine code, is executed after a preceding basic block furthermore includes a comparison instruction set which
         triggers a comparison of a last constructed value of the signature associated with the preceding basic block with an expected value of the signature determined during generation of the machine code and,
         only if the last constructed and expected values do not correspond, triggers reporting of a first fault during the execution of the machine code and, otherwise, inhibits the reporting,
      each basic block is divided into a succession of words of N bits each, where each of the succession of words includes at least one machine instruction and N is a constant integer, followed by
   b) Loading into a queue, only in complete words, one or more instructions of the machine code that are denoted by a current value of a program counter, followed by c) executing, by way of an arithmetic and logic unit in the microprocessor, instructions loaded into the queue in an order in which the instructions were loaded into the queue, wherein:
each construction instruction is encoded on strictly less than N bits, and
each word of the machine code which includes at least part of one of said instructions to be protected also includes one of said construction instructions with a result that it is impossible to load into the queue an instruction to be protected without at the same time loading a construction instruction that, when executed, modifies the current value of the signature associated with the basic block.

2. An electronic device configured to implement the method as claimed in claim 1, the electronic device including:
a random access main memory in which is recorded the machine code of the secure function, and
the microprocessor, the microprocessor being configured to execute the machine code recorded in the random access main memory and being equipped with:
the queue, the queue being configured to the loaded with the instructions to be executed by the arithmetic and logic unit in the order in which the instructions were loaded into the queue,
the program counter, and
an instruction loader configured to load into the queue, only in the complete words, the complete words each having N bits, the one or more instructions of the machine code that are denoted by the current value of the program counter.

3. A method of executing a secure function by a microprocessor comprising:
loading into a queue of the microprocessor, only in complete words, one or more instructions of a machine code that are denoted by a current value of a program counter,
executing, by way of an arithmetic and logic unit in the microprocessor, the one or more instructions loaded into the queue in an order in which the one or more instructions were loaded into the queue,
wherein the machine code is formed by a succession of basic blocks in which:
each basic block starts at a branch address and ends with an instruction to branch to a branch address of another basic block,
each basic block is associated with a signature and includes instructions to be protected, each of the instructions to be protected being one of immediately preceded and followed by a construction instruction, the construction instruction, when executed by the microprocessor, modifies a current value of the signature of the basic block in a predetermined manner to obtain a new constructed value of the signature associated with the basic block,
each subsequent basic block which, during execution of the machine code, is executed after a preceding basic block furthermore includes a comparison instruction set which:
triggers a comparison of a last constructed value of the signature associated with the preceding basic block with an expected value of the signature determined during generation of the machine code and,
only if the last constructed and the expected values of the signature do not correspond, triggers reporting of a first fault during the execution of the machine code and, otherwise, inhibits the reporting of the first fault,
each basic block is divided into a succession of words of N bits each, where each of these words includes at least one machine instruction and N is a constant integer, wherein:
each construction instruction is encoded on strictly less than N bits, and
each word of the machine code which includes at least part of one of the instructions to be protected also includes one of said construction instructions, and preventing the microprocessor from loading into the queue one of the instructions to be protected without at the same time loading a construction instruction that, when executed, modifies the current value of the signature associated with the basic block.

4. The method as claimed in claim 3, wherein each basic block starts with an initialization instruction, the method comprising:
executing the initialization instruction by the microprocessor to initialize the current value of the signature associated with each basic block to an initial value with a result that the expected value of the signature of each basic block uniquely identifies the basic block among all basic blocks of the secure function.

5. The method as claimed in claim 3, comprising:
executing, by the microprocessor, a subsequent basic block immediately after a first preceding basic block and, alternately, immediately after a second preceding basic block, wherein
the first preceding basic block includes a combinational instruction set which, when executed by the microprocessor, combines the last constructed value for the signature of the first preceding basic block with an anticipated value for the signature of the second preceding basic block in order to obtain a new last value constructed for the signature of the first preceding basic block, an anticipated value for the signature of a basic block being obtained when each of the construction instructions, associated with the instructions to be protected in the basic block, are executed by the microprocessor,
the second preceding basic block includes a combinational instruction set which, when executed by the microprocessor, combines the last constructed value for the signature of the second preceding basic block with an anticipated value for the signature of the first preceding basic block in order to obtain a new last constructed value of the signature of the second preceding basic block, and
in the subsequent basic block, the expected value of the signature of the preceding basic block is constant and equal to a combination, obtained using the same combinational instruction set, of the anticipated values of the signatures of the first and second preceding basic blocks.

6. The method as claimed in claim 3, wherein each instruction of the comparison instruction set is, like other instructions to be protected, immediately preceded or followed by a construction instruction to modify the current value of the signature associated with the basic block.

7. The method as claimed in claim 3, wherein:
the preceding basic block ends with a conditional branch instruction which, if a condition is true, causes execution of a first subsequent basic block and, otherwise, causes execution of a second subsequent basic block, the microprocessor storing a first value when the condition is true and a second, different value when the condition is false, the first subsequent basic block includes an instruction set which, when executed by the microprocessor, compares one of the stored first and second values of the condition with a first expected value for the condition, determined during the generation of the machine code and, only if the one of the stored first and second values and the first expected value do not correspond, triggers reporting of a second fault during the execution of the machine code and, otherwise, does not trigger the reporting of the second fault, and the second subsequent basic block includes an instruction set which, when executed by the microprocessor, compares the one of the stored first and second values of the condition with a second expected value for the condition, determined during the generation of the machine code and, only if the one of the stored first and second values and the second expected value do not correspond, triggers the reporting of a third fault during the execution of the machine code and, otherwise, does not trigger reporting of the third fault.

8. The method as claimed in claim 7, wherein an expected value of the condition and the expected value of the signature of the preceding basic block are encoded in the same N-bit word.

9. The method as claimed in claim 3, wherein the construction instruction is an instruction to increment or decrement a counter by a predetermined step, a value of the counter being the current value of the signature associated with the executed basic block.

10. The method as claimed in claim 3, wherein each instruction of each basic block that is not a construction instruction is an instruction to be protected.

11. The method as claimed in claim 3, comprising executing, by the microprocessor, instructions included in the machine code to automatically execute a countermeasure which limits use of the microprocessor in response to reporting of a fault in the execution of the machine code.

12. The method as claimed in claim 3, wherein:

the machine code includes a first secure function, a second secure function configured to call the first secure function and also a non-secure function configured to call the first secure function, the second secure function includes:
a branch instruction which, when executed by the microprocessor, triggers execution of the first secure function, and
an instruction set configured, when executed by the microprocessor, to transmit an identifier of the first secure function to the first secure function at a moment at which the second secure function triggers the execution of the first secure function, the first secure function includes a validation instruction set for validating the call to the first secure function, the validation instruction set, when executed by the microprocessor, is configured to compare a value of the identifier transmitted by the second secure function with an expected value of the identifier of the first secure function determined during the generation of the machine code and, only if the value of the identifier transmitted and the expected value of the identifier of the first secure function do not correspond, trigger reporting of a second fault during the execution of the machine code and, otherwise, not report the second fault, the non-secure function includes a branch instruction which, when executed by the microprocessor, triggers the execution of the first secure function, and the non-secure function has no instruction set configured, when executed by the microprocessor, to transmit an identifier of the first secure function to the first secure function at a moment at which the non-secure function triggers the execution of the first secure function, the first secure function includes a first and a second branch address, the first branch address being located before or at the start of the validation instruction set and the second branch address being located after the validation instruction set, the branch instruction of the second secure function assigns to the program counter a value of the first branch address with a result that when the first secure function is called by the second secure function, the execution of the first secure function starts before or with the validation instruction set, and the branch instruction of the non-secure function assigns to the program counter a value of the second branch address with a result that when the first secure function is called by the non-secure function, the execution of the first secure function starts after the validation instruction set.

13. The method as claimed in claim 12, comprising:

executing the first secure function to transmit an identifier of the second secure function to the second secure function at a moment at which an execution flow returns from the first secure function to the second secure function, and executing a validation instruction set of the second secure function to validate a return from the first secure function by comparing a value of the identifier transmitted by the first secure function with an expected value of the identifier of the second secure function determined during the generation of the machine code and, only if the value of the identifier transmitted by the first secure function and the expected value of the identifier of the second secure function do not correspond, triggering reporting of a third fault and, otherwise, not triggering reporting of the third fault.

14. A non-transitory information recording medium, comprising instructions that when executed by the microprocessor, execute the method claimed in claim 3.

* * * * *